United States Patent
Molinet et al.

(10) Patent No.: US 10,057,741 B2
(45) Date of Patent: Aug. 21, 2018

(54) CONTEXTUAL DEEP LINKING OF APPLICATIONS

(71) Applicant: Branch Metrics, Inc., Palo Alto, CA (US)

(72) Inventors: Michael Charles Molinet, Palo Alto, CA (US); Maria Madalina Seghete, Palo Alto, CA (US); Alexander John Austin, Palo Alto, CA (US); Dmitri Gaskin, Albany, CA (US)

(73) Assignee: Branch Metrics, Inc., Palo Alto, CA (US)

( * ) Notice: Subject to any disclaimer, the term of this patent is extended or adjusted under 35 U.S.C. 154(b) by 175 days.

(21) Appl. No.: 14/935,301

(22) Filed: Nov. 6, 2015

(65) Prior Publication Data

US 2016/0142858 A1 May 19, 2016

Related U.S. Application Data

(60) Provisional application No. 62/096,833, filed on Dec. 24, 2014, provisional application No. 62/079,512, filed on Nov. 13, 2014.

(51) Int. Cl.
*H04L 29/08* (2006.01)
*H04W 4/60* (2018.01)
(Continued)

(52) U.S. Cl.
CPC .............. *H04W 4/60* (2018.02); *H04L 67/02* (2013.01); *H04L 67/125* (2013.01); *H04L 67/42* (2013.01); *H04W 4/003* (2013.01)

(58) Field of Classification Search
CPC ........ H04L 67/02; H04L 67/42; H04L 67/125
(Continued)

(56) References Cited

U.S. PATENT DOCUMENTS 7,769,767 B2 * 8/2010 Petersen ........... G06F 17/30867
707/754
2013/0305218 A1 11/2013 Hirsch et al.
(Continued)

FOREIGN PATENT DOCUMENTS

WO WO 2014/096553 A1 6/2014

OTHER PUBLICATIONS

Bedogni, L. et al., "An Interoperable Architecture for Mobile Smart Services over the Internet of Energy," 2013 IEEE 14th International Symposium and Workshops on a World of Wireless, Mobile and Multimedia Networks, Jun. 7, 2013, 16 pages, [Online] [Retrieved on Jan. 1, 2016], Retrieved from the Internet<URL:https://www.researchgate.net/profile/Luca_Bedogni/publication/250614709_An_Interoperable_Architecture_for_Mobile_Smart_Services_over_the_Internet_of_Energy/links/02e7e524aa51b2d0b2000000.pdf>.
(Continued)

*Primary Examiner* — Adnan Mirza
(74) *Attorney, Agent, or Firm* — Fenwick & West LLP

(57) ABSTRACT

A contextual deep linking server receives a request associated with a valid contextual deep link from a client device, the contextual deep link associated with link data indicating a particular configuration of an application. The server also receives, after determining that the client device has stored a previously generated fingerprint, stored contextual information for the client device identified by a locally stored fingerprint that matches the previously generated fingerprint. The server then generates, after determining that the client device does not have the previously generated fingerprint, a unique fingerprint of the client device based on a plurality of characteristics of the client device and determining contextual information of the request based on a characteristic of the client device. The server also transmits a response to the client device that is selected based on the contextual infor-
(Continued)

mation of the client device such that the response is operable on the client device.

19 Claims, 7 Drawing Sheets

(51) Int. Cl.
*H04W 4/00* (2018.01)
*H04L 29/06* (2006.01)

(58) Field of Classification Search
USPC .......................................................... 709/203
See application file for complete search history.

(56) References Cited

U.S. PATENT DOCUMENTS

| | | |
|---|---|---|
| 2014/0181256 A1 | 6/2014 | Trifa et al. |
| 2014/0214916 A1* | 7/2014 | Gokul ................... G06Q 30/02 709/201 |
| 2015/0156061 A1 | 6/2015 | Saxena et al. |
| 2016/0055133 A1 | 2/2016 | Look et al. |

OTHER PUBLICATIONS

PCT International Search Report and Written Opinion, PCT Application No. PCT/US15/60004, dated Mar. 1, 2016, 16 pages.
European Extended Search Report, European Application No. 15858275.9, dated Jun. 21, 2018, 7 pages.

\* cited by examiner

CONTEXTUAL DEEP LINKING OF APPLICATIONS

CROSS REFERENCE TO RELATED APPLICATION

This application claims the benefit of U.S. Provisional Application No. 62/096,833, filed Dec. 24, 2014, and claims the benefit of U.S. Provisional Application No. 62/079,512, filed Nov. 13, 2014, both of which are incorporated by reference in their entirety.

BACKGROUND

Field of Art

The disclosure generally relates to the field of mobile applications, and specifically to contextual deep linking of mobile applications.

Description of Art

The development of application ecosystems on client devices (such as the ecosystem associated with "application stores" on smartphones) has created a system where users can easily install new applications and immediately add new functionality to their client devices. This is because the applications that are provided by the ecosystem are semi-standardized to provide a unified installation process, and may use standardized library functions provided by the ecosystem. However, as the number of applications provided by these ecosystems increase, the environment on a user's client device becomes less cohesive as unlike with hyperlinks on the Internet, each application on the client device is unable to easily link to a section of another application on the client device through the application installation process. Additionally, users are unable to direct other users to particular sections of these applications either, especially in the case where the other user does not have the application installed on his or her client device. This creates a situation where users are forced to operate each application in semi-isolation. Hence, what was lacking was a method of easily directing users to sections within applications and passing data to applications, regardless of the type of client device the user and whether the application is installed on the client device.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

DETAILED DESCRIPTION

Figure 1:
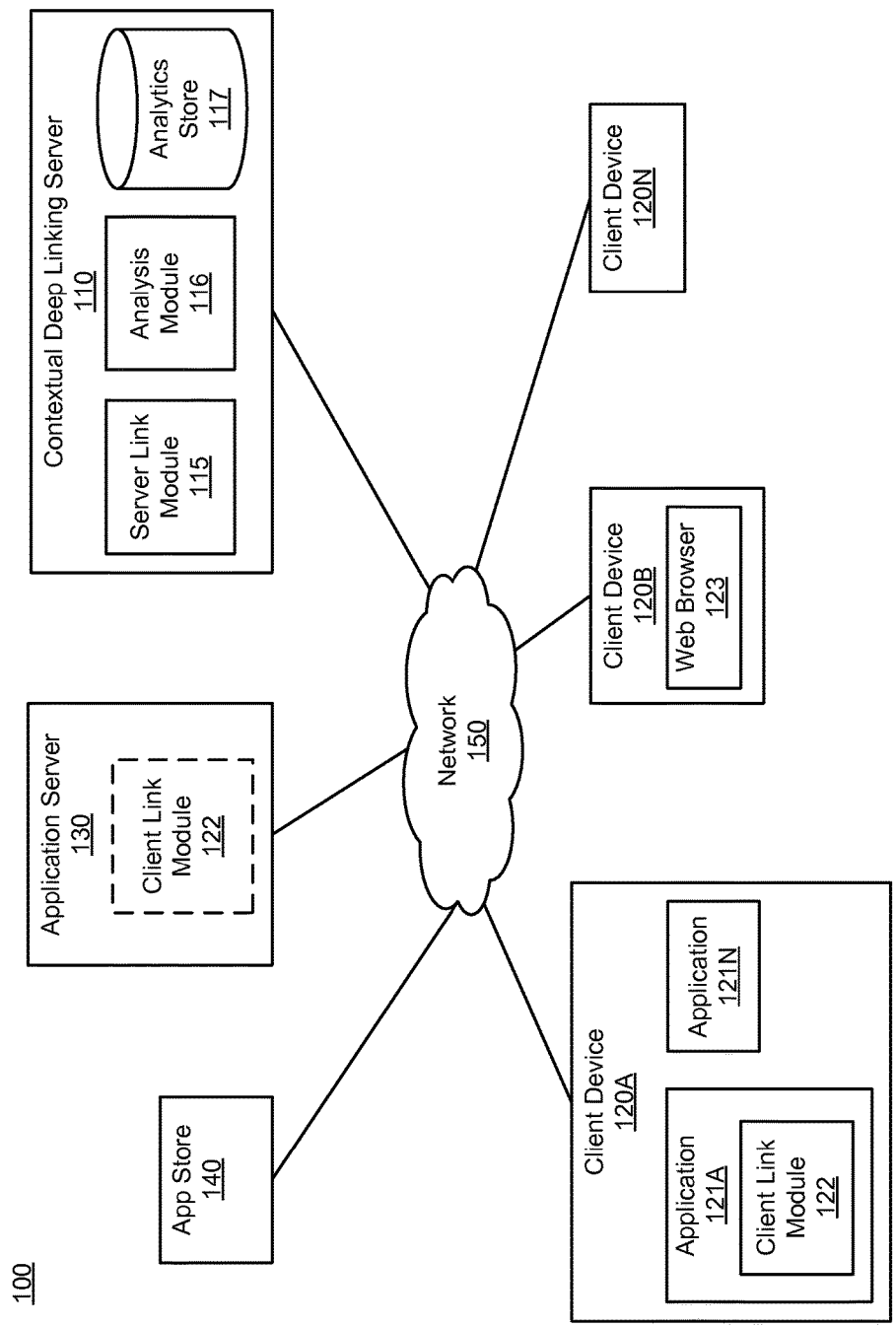
FIG. 1 illustrates an example system capable of contextual deep linking

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Disclosed by way of example embodiments is a system for creating and using contextual deep linking In an embodiment, a contextual deep linking server receives a request associated with a valid contextual deep link from a client device. The contextual deep link is associated with link data indicating a particular configuration of an application.

The server retrieves, in response to determining that the client device has stored an indicator of a previously generated fingerprint, stored contextual information for the client device identified by a locally stored fingerprint that matches the previously generated fingerprint as determined by the indicator stored on the client device. This contextual information is stored on the contextual deep linking server. Otherwise, the contextual deep linking server generates, in response to determining that the client device does not have an indicator of a previously generated fingerprint, a unique fingerprint of the client device based on characteristics of the client device and determining contextual information of the request based on a characteristic of the client device. These characteristics may include the IP address, operating system version, hardware identifier, operating system provided identifier, and other characteristics that when combined may create a unique fingerprint for the client device.

The contextual deep linking server then transmits a response to the client device that is selected based on the contextual information of the client device such that the response is operable on the client device. For example, if the contextual information indicates that the client device supports an application ecosystem, the response can cause the client device to open the application specified in the link data of the contextual deep link. Otherwise, if the client device does not support an application ecosystem, the response can cause the client device to open a landing page on a web browser with more information about the application. As another example, if the application is not installed, the response can cause the client device to open an application that interfaces with an application store where the user may download and install the application.

Example Contextual Deep Linking System

FIG. 1 illustrates an example system 100 capable of contextual deep linking The system 100 includes one or more client devices 120, an application store 140, an application server 130, and a contextual deep linking server 110. Although the illustrated system 100 includes the elements shown in FIG. 1, in other embodiments the system 100 may include different elements. Furthermore, the functionalities of each element may be distributed differently among the elements in other embodiments.

The network 150, which can be wired, wireless, or a combination thereof, enables communications among the client devices 120, the application store 140, the application server 130, and the contextual deep linking server 110 and may include the Internet, a LAN, VLAN (e.g., with VPN), WAN, or other network. In one embodiment, the network 150 uses standard communications technologies and/or protocols, such as Hypertext transfer Protocol (HTTP), Transmission Control Protocol/Internet Protocol (TCP/IP), Uniform Resource Locators (URLs), and the Doman Name System (DNS). In another embodiment, the entities can use custom and/or dedicated data communications technologies instead of, or in addition to, the ones described above.

The application store 140 is a component in an application ecosystem (e.g., a mobile application ecosystem) that provides a centralized location for client devices to submit requests for applications to be installed on the client device 120. The application store 140 provides an interfacing application that may be preinstalled on the client devices 120. The application store 140 also includes a database of available applications along with application metadata such as installation requirements, application permissions, and so on. The application store 140 receives requests to install applications from the interfacing application. In response to the request, the application store 140 transmits the data used to install the application to the client device 120.

The client devices 120 are electronic devices used by users to perform functions such as consuming digital content, executing software applications, browsing websites hosted by web servers on the network 150, downloading files, and interacting with the application store 140, the application server 130, and the contextual deep linking server 110. For example, the client devices 120 may be dedicated e-readers, smartphones, wearables (e.g., smartwatches or pendants), or tablets, laptops, or desktop computers configured similar to an exemplary machine (or computing system) described with FIG. 7.

Each client device 120 includes one or more applications 121 that when executed by the client device 120 perform various functions as defined by the application developer. The application 121 may utilize the operating system and hardware features of the client device 120, and may interface with the user using one or more input/output components of the client device 120. Examples of applications 121 include a navigation application, an online radio application, an electronic (e-) commerce application, a local business reviews application, and so on.

In one embodiment, one or more applications 121 support contextual deep links. A contextual deep link indicates a particular configuration for an application 121. In some cases, this configuration is simply a reference to a location in an application 121, such as a section within the application 121. For example, a particular location in a crowdsourced review application may be a review page for a local restaurant. This link to a location in the application 121 by itself may also be known as a deep link. In other cases, this configuration includes particular settings, parameters, variables, and other options for the application 121. For example, a particular set of settings for an e-commerce application may set a certain referral bonus for a particular user account.

In one embodiment, the contextual deep link may be a Uniform Resource Locator (URL). Furthermore, when a client device 120 makes a request associated with a contextual deep link for the application 121, the client device 120 receives from the contextual deep linking server 110 a response that is based on the contextual information of the client device 120. The contextual information may include the platform of the client device 120 (e.g., mobile or desktop), the type and version of the operating system executing on the client device 120, whether the application 121 is installed on client device 120 already, and so on. As the response is contextual and not fixed, any client device 120 is able to operate on the response. This allows for the use of the contextual deep link across all client device platforms.

As an example, a contextual deep link may be au URL in the format of "http://link-provider.com/[application identifier]/[unique identifier]". In this example, "link-provider.com" is the domain name associated with the entity performing the operations coordinating the contextual deep linking This may be associated with a specialized server such as a contextual deep linking server as described below. The "[application identifier]" is a unique character string identifier that identifies the application in question. The "[unique identifier]" is another unique character string identifier that identifies the particular link. Note that other embodiments of a contextual deep link may have a different combination of identifiers in a URL (e.g., the URL may include a query string). When a user clicks (or interacts) with the contextual deep link, a request is made to the "link-provider.com" server which receives the unique identifiers and is able to send a contextually valid response to the client device 120 of the user. For example, if the user is using a mobile device that supports a mobile application ecosystem, the server may detect this contextual information and respond with a redirection to the application store on the user's client device 120 if the user does not have installed the application referenced in the link.

To support contextual deep linking, in one embodiment, an application 121 includes a client link module 122 that requests contextual deep links from the contextual deep linking server 110 and retrieves link data related to contextual deep links from the contextual deep linking server 110. To create a contextual deep link to send to a second client device 120, the first client link module 122 on a first client device 120 requests the contextual deep link from the contextual deep linking server 110. The first client link module 122 also sends link data to the contextual deep linking server 110, indicating a particular configuration of the application 121. The first client link module 122 then receives newly generated contextual deep link from the contextual deep linking server 110.

When the second client device 120 sends a request associated with the contextual deep link (e.g., as a result of receiving a tap interaction to the contextual deep link from a user), the second client device 120 receives a response from the contextual deep linking server 110. If the application 121 indicated by the link data of the contextual deep link is already installed on the second client device 120, then the response includes a link that causes the second client device 121 to open or initiate the application 121 on the second client device 120. When the application 121 initiates, the second client link module 122 on the application 121 of the second client device 120 transmits a request to the contextual deep linking server 110 for any link data. The second client link module 122 then uses the received link data to configure the application 121. If the application 121 indicated by the link data of the contextual deep link is not installed on the second client device 120, the response includes a link that causes the second client device 121 to open or initiate an application that interfaces with the application store 140 and which causes the application store application to open a landing page of the application 121.

In another embodiment, to create a contextual deep link, the client link module 122 does not initially request a contextual deep link from the server. Instead, the client link module 122 may independently generate a contextual deep link according to a particular format that also includes the link data for which the application is configured to associate with the contextual deep link. In one embodiment, this format is "link-provider.com/key=[application identifier]?[link data]," where the "application identifier" represents an identifier of the application as described above, and the "link data" represents a query string with the link data that the application is configured to associate with the independently generated contextual deep link.

When the second client device 120 sends a request associated with the contextual deep link, the request is made to the contextual deep linking server 110. The contextual deep linking server 110 identifies the link data indicated in the independently generated contextual deep link and stores the link data. The contextual deep linking server 110 generates a new contextual deep link, and associates the newly stored link data with the newly generated contextual deep link. The contextual deep linking server 110 responds to the request from the second client device 120 with this newly generated contextual deep link. The second client device 120 is directed to the location indicated by the newly generated contextual deep link, and receives response data that causes the second client device 120 to perform one or more actions as described above for the non-independently generated contextual deep link.

In one embodiment, the responses described above are performed in real time by the contextual deep linking server 110 such that there is no delay or no delay beyond a threshold or user perceptible time period between a request made to the contextual deep linking server 110 and a response by the contextual deep linking server 110. By having the responses be made in real-time or near real-time, the user does not easily perceive any delay in determining the context or configuring the application based on the link data, thus providing a seamless experience.

In some embodiments, this client link module 122 is provided by the developer of the contextual deep linking system to the developer of the application 121 as a plug-in or library that is inserted into the application 121.

In some embodiments, the client device 120 includes a web browser 123 that can transmit requests associated with contextual deep links. In such a case, the contextual deep link takes the form of a Hypertext Markup Language (HTML) hyperlink. The web browser 123 displays the hyperlink contextual deep link and if a user clicks, taps, or interacts with the hyperlink, the web browser 123 submits a request to the contextual deep linking server 110 indicated by the hyperlink. The web browser 123 then receives a response based on the context of the client device 120 that is executing the web browser 123.

The contextual deep linking server 110 generates contextual deep links in response to requests from applications, sends responses to client devices making requests for valid contextual deep links, and provides analytics regarding the contextual deep links to application owners. As illustrated, the contextual deep linking server 110 includes a server link module 115, an analysis module 116, and an analytics store 117.

The server link module 115 generates contextual deep links in response to requests and transmits responses to requests associated with valid contextual deep links that are selected based on the context of the client device making the request.

In one embodiment, the server link module 115 receives requests from applications 121 to generate contextual deep links. When the server link module 115 receives such a request, it generates a new contextual deep link and associates that link with the information associated with the request. The server link module 115 may also receive link data along with the request. As described above, this link data describes information that the application 121 has requested to be associated with the generated contextual deep link and can indicate a particular configuration of an application 121. The server link module 115 stores this link data and associates it with the generated contextual deep link.

The server link module 115 also responds to requests associated with contextual deep links. When the server link module 115 receives a request from a client device 120 associated with a contextual deep link, the server link module 115 determines if the client device 120 has stored an indicator of a unique fingerprint (e.g., in a cookie). If such an indicator of a fingerprint exists, the server link module 115 retrieves previously stored contextual information about the client device 120 based on the fingerprint. If no fingerprint exists, the server link module 115 generates one based on characteristics of the client device 120 (e.g., network address, operating system version, and so on). The server link module 115 also determines contextual information for the client device 120 based on the characteristics of the client device 120. Based on the contextual information, the server link module 115 transmits a response back to the client device 120 such that the response is operable on the client device 120.

Additionally, the server link module 115 may receive a request for link data from an application 121 on a client device 120. The server link module 115 once again determines the fingerprint of the client device 120 and retrieves any link data that is associated with a contextual deep link that has a recently associated request from a client device 120 with the same fingerprint. The server link module 115 sends this link data to the client device 120.

The analysis module 116 analyzes requests associated with contextual deep links to provide analytics information for an owner of an application. An owner of an application may be the developer of the application 121 or an entity that owns the legal rights to the application 121. The types of analytical information that the analysis module 116 provides to the owner may include the client devices 120 that have clicked on contextual deep links, known information about client devices 120 including characteristics of the client devices 120, as well as inferred profile information of the users of the client devices based on their contextual deep link interaction history.

The analysis module 116 may also provide information to the owner of an application 121 regarding some the actions that a user performs in the application 121 that was referenced by a contextual deep link. Examples of such actions may include the sections in the application that a user subsequently accessed, any sponsored content that the user subsequently consumed in the application 121, and so on. In one embodiment, the analysis module 116 provides the information described above to the owner via a web interface.

In one embodiment, the contextual deep linking server 110 receives from the owner of the application tagging information associated with each contextual deep link. The tagging information may be included in the link data or a separate tag data for the contextual deep link. The analysis module 116 provides the tagging information to the owner for each contextual deep link that has been interacted with and which has tagging information associated with it. Examples of tags include tags indicating campaigns, tags indicating referral programs, tags indicating invites, and so on.

The analytics store 117 stores the data that the analysis module 116 uses to provide analytics information to the owner. This data may include the data described above that is used by the analytics module 116. In one embodiment, the data in the analytics store 117 is received from the server link module 115.

The application server 130 provides any server side functionality that is needed for one or more of the applications 121. While a single application server 130 is illustrated, in other embodiments more than one application server 130 may be used to support different applications 121. Although the application server 130 is illustrated with a client link module 122, in other embodiments the application server 130 also includes additional components, such as server-side application module to process server-side functions of the application 121, a web server, and/or a database to store server-side data related to the application 121. As with the functionality of the application 121, the functionality of the application server 130 is primarily determined by the owner of the application 121 itself.

In one embodiment, the application server 130 includes a client link module 122 that may perform the same functions as the client link module 122 on the application 121. The client link module 122 may be used to request a contextual deep link from the contextual deep linking server 110. The client link module 122 on the application server 130 provides this generated contextual deep link to client devices 120 that connect to the application server 130. For example, the application server 130 may include a web server, and the application server 130 may receive a web page request from a client device 120. In response, the client link module 122 on the application server 130 may request a contextual deep link and present this to the user of the client device 120 via the web server.

The system 100 described above presents an improved method in computer networks of sending a link that indicates a particular configuration within an application of an application ecosystem based on the contextual information of the client device making the request associated with the link. Such a system may be used to at least address an issue in computer networks of how to identify a client device through separate requests to a server in order to send link data associated with a contextual deep link to the client device. Additionally, such a system may be used to at least address an issue in computer networks of how to provide access to a deeper level of an application, such as to provide access to a location in an application, or to provide access to a configuration of the application. An application can request a contextual deep link that indicates a particular configuration within the application, and a contextual deep linking server responds with the newly generated contextual deep link. When a user of a client device interacts with the contextual deep link, the contextual deep linking server determines the context of the client device by determining the characteristics of the client device, and transmits a response to the client device that is appropriate based on the context. The contextual deep linking server also associates the contextual deep link with a fingerprint of the client device.

The response may initiate an application on the user's client device, which submits a request to the contextual deep linking server for link data associated with any recently used contextual deep links The contextual deep linking server matches the fingerprint provided by the application with a fingerprint associated with a contextual deep link and sends the associated link data to the application, which can then be used to configure the application, thus allowing data to be passed to cross-application and cross-device.

Example Client Link Module of an Application

Figure 2:
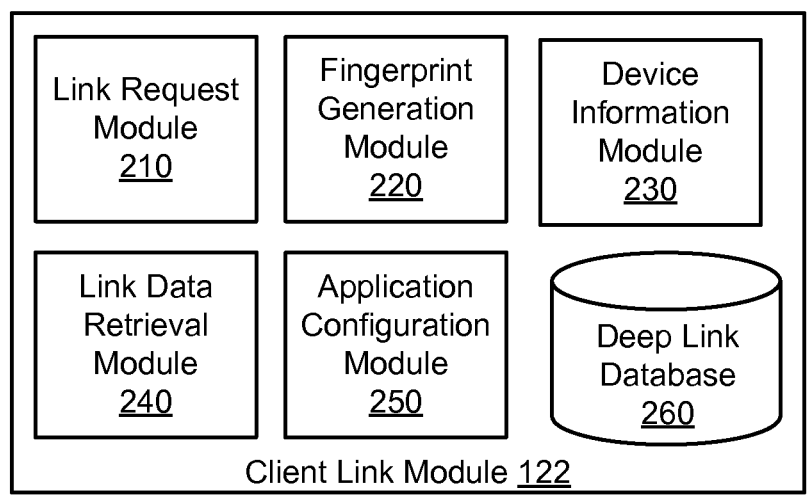
FIG. 2 illustrates the client link module according to an embodiment.

FIG. 2 illustrates the client link module 122 of FIG. 1 according to an embodiment. As illustrated, the client link module 122 includes a link request module 210, a fingerprint generation module 220, a device information module 230, a link data retrieval module 240, an application configuration module 250, and a deep link database 260. Although the illustrated client link module 122 includes the elements shown in FIG. 2, in other embodiments the client link module 122 may include different elements. Furthermore, the functionalities of each element may be distributed differently among the elements in other embodiments.

The deep link database 260 stores indicators of locations within the application 121 and/or other configuration information that are indicated in link data for contextual deep links. Locations are pages, sections, content items, and any other element in the application that a user can navigate to. For example, in an Internet radio application, a location may include a particular radio station's landing page within the application. In one embodiment, the deep link database 260 stores the indications of these locations in a hierarchical tree that matches the navigation structure of the application. Thus, for each location in the application, the deep link database 260 may include an indicator of the location itself as well as branches to indicators representing the various subsequent locations that can be reached directly from that location. In one embodiment, the deep link database 260 includes a mapping between an internal set of indicators for a location and the external indicator of the location used for the contextual deep link.

In one embodiment, the deep link database 260 also stores information regarding discount rates and codes, referral information, and other details regarding data that may be transmitted via link data. For example, the link data may indicate a discount code, and the deep link database 260 stores the discount rate information regarding this discount code. When the link data with that discount code is received by the client link module 122, the client link module 122 retrieves the detailed discount information from the deep link database 260 indicated by the discount code.

To create the deep link database 260, a developer of an application 121 may manually enter each location or other data into the deep link database 260. In one embodiment, the locations are automatically gathered by the client link module 122 while a user uses the application 121 and visits different locations within the application 121. In another embodiment, the client link module 122 crawls the various locations in the application 121 to populate the deep link database 260.

The link request module 210 transmits generation requests for new contextual deep links to the contextual deep linking server 110. In some cases, the link request module 210 receives a request from the application 121 to request a new contextual deep link in order to transmit link data to another client device 120. As described above, link data indicates a particular configuration for the application 121. In one embodiment, the configuration information in the link data indicates a location in the application, and this location indicator may be retrieved by the link request module 210 from the deep link database 260. In another embodiment, the configuration information in the link data includes other information for the application. For example, the link data may include referral data that the intended recipient application of the link data can use to automatically fill out a referral code field.

To request the new contextual deep link, the link request module 210 may transmit a request for a new contextual deep link to the contextual deep linking server 110. This request includes the link data that the application 121 intends for the recipient of the newly generated contextual deep link to access. Subsequent to the request, the link request module 210 receives the newly generated contextual deep link, and/or may receive a status/error message from the contextual deep linking server 110. As noted above, in some embodiments, the client link module 122 may independently generate a contextual deep link. In such a case, the link request module 210 does not contact the contextual deep linking server 110.

In some embodiments, the contextual deep link is in the form of a URL, with the domain name being associated with the contextual deep linking server 110, and with a query string being a randomly generated unique variable that is used to uniquely identify the contextual deep link. In another embodiment, the domain name is associated with the owner of the application, and the contextual deep link, when interacted with, causes a redirect to the contextual deep linking server 110.

The fingerprint generation module 220 generates a unique fingerprint for the client device 120 based on one or more characteristics of the client device 120. The characteristics of the client device 120 are information about the client device 120 that may be used to uniquely identify the client device 120. The information about the client device may include its network address (e.g., IP address), operating system type and version, list of other installed applications, geographic location, device model information, screen size, and so on. A characteristic of the client device 120 may also include a tracking identifier unique to the client device 120 and generated by the operating system of the client device 120 for the purposes of tracking the client device 120. To generate the fingerprint, the fingerprint generation module 220 takes one or more of these characteristics and generates a unique value that is unique to the client device. In one embodiment, the fingerprint generation module 220 generates the fingerprint by using a hashing algorithm, such as MD5 or SHA-1, on values that represent the characteristics. For example, the fingerprint generation module 220 may hash a string comprising the example characteristics listed above into a unique hash value that represents the fingerprint. In other embodiments, the fingerprint generation module 220 generates the fingerprint by appending together one or more values representing the characteristics.

The number of characteristics to use when generating the fingerprint may be the minimal number of characteristics needed to ensure a high level or percentage of uniqueness among all potential client devices. To compute this minimal number, the contextual deep linking server 110 may increase the number of characteristics until the different permutations of these characteristics when generating a fingerprint exceeds a predetermined number or are larger than the number of estimated client devices in existence or which may be encountered by a certain value or by an order of magnitude. The number of characteristics to use may also be set manually by an administrator. Certain characteristics may be excluded by the fingerprint generation module 220 from being used to generate the fingerprint if they are only available on certain platforms of client devices 120, if they would not be exposed by a web browser executing on the client device 120 to a web server during a page request, or if they may risk revealing an unnecessary amount of extraneous information.

The device information module 230 collects device information of the client device 120 that can be submitted to the contextual deep linking server 110. Device information includes any information of the client device 120 that can be used by the contextual deep linking server 110 to determine contextual information about the client device 120. Device information for the client device 120 may include the characteristics as described above, a list of installed applications, or configuration settings. As the device information module 230 is part of the application 121, it is able to collect more detailed information about the client device 120 than what would be exposed via a web browser or network request from the client device 120 to the contextual deep linking server 110.

In one embodiment, the device information module 230 collects at least the list of applications installed on the client device 120 such that the contextual information for the client device 120 includes a known list of applications that are available to link to on the client device 120.

The link data retrieval module 240 retrieves any link data from the contextual deep linking server 110 when the application 121 is initialized. An application 121 is initialized on a client device 120 when it begins execution. This may mean that the application was not resident in the volatile memory of the client device 120 or may only have had a stub application or background process executing. Initialization may also occur when an application 121 regains focus on a client device after it has lost focus, or when an application is newly installed.

After initialization of the application 121, the link data retrieval module 240 transmits a request to the contextual deep linking server 110 to request link data, if any. Along with the request, the link data retrieval module 240 also sends the fingerprint of the client device 120 as generated by the fingerprint generation module and may also send device information as collected by the device information module 230 to the contextual deep linking server 110. The link data retrieval module 240 then receives any link data that is associated with the fingerprint from the contextual deep linking server 110. In one embodiment, this link data is sent to the application configuration module 250.

The application configuration module 250 receives the link data and configures the application based on information in the link data. As noted above, link data includes configuration information for the application. In particular, in one embodiment, the link data includes one or more key value pairs. These key value pairs may be arranged in a parameter table. The key of the key value pair describes a particular application configuration property, and the value associated with that key describes how to configure that property. The value may be in the form of a numerical value, computer instructions, text, binary data, and so on.

In some embodiments, when the key value pair indicates a location in the application, the application configuration module 250 determines the location associated with that location indicator and configures the application 121 to present the location to the user of the client device 120. The application configuration module 250 may present the location to the user by looking up the location indicator in the deep link database 260 to find the mapped location or navigational path to the location for the application.

In some embodiments, when the key of a key value pair in the link data indicates a different property for the application 121, the application configuration module 250 configures the property based on the value. The particular method in which the property is configured is based on the application. For example, if the application is a navigation application, and a key in a key value pair of the link data indicates a navigation destination property, the application configuration module 250 may configure the application to set the navigation destination to the data in the value of the key value pair.

Example Server Link Module of a Contextual Deep Linking Server

Figure 3:
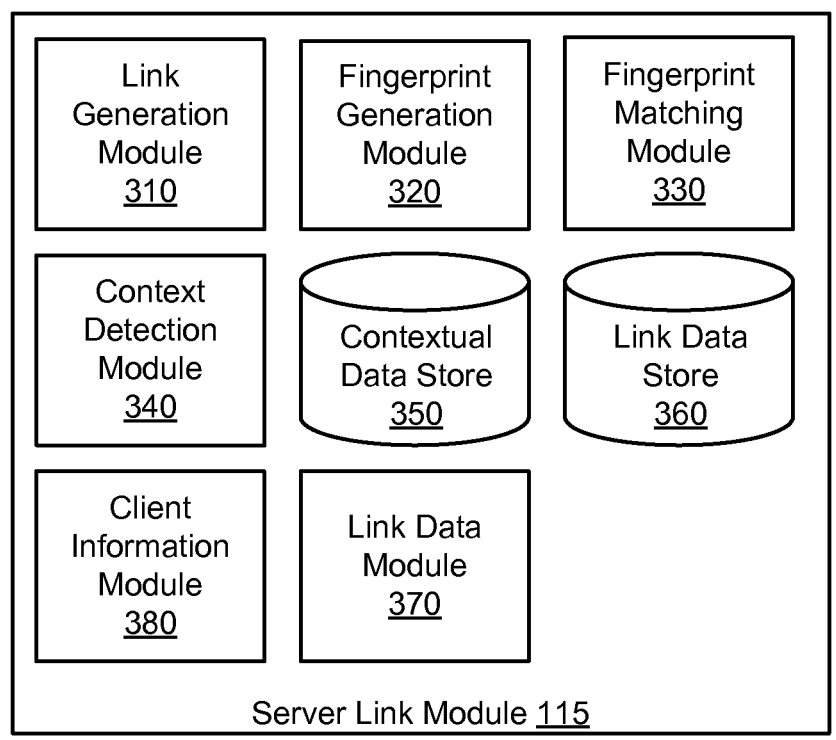
FIG. 3 illustrates the server link module according to an embodiment.

FIG. 3 illustrates the server link module 115 of FIG. 1 according to an embodiment. As illustrated, the server link module 115 includes a link generation module 310, a fingerprint generation module 320, a fingerprint matching module 330, a contextual response module 340, a contextual data store 350, a link data store 360, and a link data module 370. Although the illustrated server link module 115 includes the elements shown in FIG. 3, in other embodiments the server link module 115 may include different elements. Furthermore, the functionalities of each element may be distributed differently among the elements in other embodiments.

The fingerprint generation module 320 generates a unique fingerprint of the client device 120 based on one or more characteristics of the client device 120. In some cases, the server link module 115 receives a request associated with a contextual deep link from a client device 120 that is unable to independently generate a fingerprint or has not transmitted a fingerprint to the server link module 115. In such a case, the fingerprint generation module 320 generates a unique fingerprint of the client device 120 based on the characteristics of the client device 120.

In one embodiment, the contextual deep link is a URL and the contextual deep linking server 110 receives a request associated with the contextual deep link from a web browser 123 of a client device 120. The fingerprint generation module 320 generates a fingerprint in this case based on the characteristics of the client device 120 that are exposed by the web browser 123 and present in the request. These characteristics may include network address (e.g., IP address), operating system version, operating system type, device model information, and screen size. Some of these characteristics may be determined using the user agent field provided by the web browser 123. Some of these characteristics may be determined by executing instructions, such as JavaScript code, on the web browser 123.

As described above for the fingerprint generation module 220 on the client link module 122, the fingerprint generated by the fingerprint generation module 320 may be a hash or other unique identification format.

After generating the fingerprint for the client device 120, the fingerprint generation module 320 stores the fingerprint locally in one or more data stores. The fingerprint generation module 320 also stores an indicator of the fingerprint on the client device 120. The indicator may be any string or other value that may be uniquely generated. In one embodiment, the fingerprint generation module 320 stores the indicator in a cookie on the web browser 123 of the client device 120. The indicator of the fingerprint stored on the client device 120 may be used to retrieve the indicated fingerprint from a local data store.

A benefit of storing an indicator of the fingerprint instead of the fingerprint itself on the client device 120 is that one client device 120 may be associated with multiple fingerprints. This may be due to the method in which a fingerprint is generated. For example, a fingerprint may be generated based on a timestamp or network address, and so the fingerprint may change for the same client device 120. Thus, storing an indicator of a fingerprint on the client device 120 allows the contextual deep linking server 110 to associate that client device 120 with multiple fingerprints without necessarily having to change the value of the indicator.

The contextual data store 350 stores contextual information regarding client devices 120 that the server link module 115 has connected to or encountered. As described above, contextual information may include the platform type (e.g., mobile or desktop), as well as other characteristics of the client device 120 such as the type and version of the operating system executing on the client device 120. Contextual information stored in the contextual data store 350 may also include other information received from the client device 120, such as information received from the client device 120 that was collected by the device information module 230 as described above. These may include a list of installed applications on the client device 120 and other detailed information about the client device 120. Each set of contextual information for a client device 120 may be associated with a unique client device identifier. In some cases, this identifier is the fingerprint that is generated by the fingerprint generation module 220 and/or the fingerprint generation module 320 for the client device 120. For each new client device 120 that has not previously been encountered, the server link module 115 may add a new entry into the contextual data store 350 with the contextual information for the new client device 120 and its associated fingerprint.

The client information module 380 collects contextual information about a client device 120 to store into the contextual data store 350. In one embodiment, the client information module 380 collects the contextual information from the client device 120 that is based on the characteristics of the client device 120 that are exposed in the request made by the client device 120, as described above for the fingerprint generation module 320. In one embodiment, the client information module 380 collects the contextual information from the client device 120 based on information received from the client device 120 via the device information module 230.

The link data store 360 stores generated contextual deep links and associated link data and fingerprints for those client devices 120 that have interacted with the contextual deep links. As described above, link data is data that may be submitted by a client device 120 for a request to generate a new contextual deep link, and a fingerprint is a unique identifier for a client device 120 that is generated by the fingerprint generation module 220 and/or the fingerprint generation module 320. Once a new contextual deep link is generated, an entry for that link, and any associated link data, is stored in the link data store 360 by the server link module 115. Once a client device 120 transmits a request associated with that contextual deep link, a fingerprint may be generated for that client device 120. This fingerprint is then stored in the link data store 360 by the server link module 115 and associated with contextual deep link in the link data store 360.

The link generation module 310 generates contextual deep links in response to requests made by the client link module 122. In response to the request from the client link module 122 to generate a contextual deep link, the link generation module 310 generates a link with a unique identifier. As described above, in some embodiments, the contextual deep link is a URL with a randomly generated query string. In one embodiment, the link generation module 310 also receives the link data from the client link module 122. The link generation module 310 stores this link data in the link data store 360 along with the unique identifier for the generated contextual deep link. The link generation module 310 then transmits the contextual deep link that was generated to the client link module 122.

The fingerprint matching module 330 finds matches between stored fingerprints and fingerprints indicated by or newly generated for client devices 120. Fingerprints are stored in both the contextual data store 350, which stores contextual information for client devices 120, and in the link data store 360, which stores link data for contextual deep links.

In some cases, the contextual deep linking server 110 receives a request from a client device 120 associated with a contextual deep link that includes an indicator to a unique fingerprint, where the indicator was previously stored on the client device 120 by the fingerprint generation module 320.

In other cases, the contextual deep linking server 110 receives a request from a client device 120 for any link data that includes a fingerprint. This fingerprint may have been generated by the fingerprint generation module 220 in the client link module 122.

In yet other cases, the contextual deep linking server 110 receives a request from a client device 120 associated with a contextual deep link that does not include an indicator of a fingerprint. Instead, the fingerprint generation module 320 generates a fingerprint for the client device 120 in the method described above.

In the above cases, the fingerprint matching module 330 searches the contextual data store 350 and the link data store 360 for previously stored fingerprints matching the fingerprints received from the client device 120, indicated by an indicator of a fingerprint received from the client device 120, or matching a newly generated fingerprint generated by the fingerprint generation module 320. In one embodiment, the fingerprint matching module 330 finds a match when the fingerprint received from or indicated by the client device 120 and the previously stored fingerprint match exactly. In other embodiments, the fingerprint matching module 330 finds a match when the fingerprint received from or indicated by the client device 120 and the previously stored fingerprint match on a threshold number of elements (e.g., this may be the case when the fingerprint is composed of a number of separate elements).

Upon a match in the contextual data store 350, the fingerprint matching module 330 indicates to the contextual response module 340 that a matching fingerprint exists in the contextual data store 350 and indicates the matching fingerprint. Upon a match in the link data store 360, the fingerprint matching module 330 indicates to the link data module 370 that a matching fingerprint exists in the link data store 360 and indicates the matching fingerprint. Upon no match, the fingerprint matching module 330 indicates that no match exists.

The contextual response module 340 determines the contextual information for client devices 120 based on the fingerprint of the client devices 120 and provides a response to the client device 120 based on the contextual information of the client device.

After receiving a request from the client device 120 associated with a contextual deep link, the contextual response module 340 may receive an indication of a matching fingerprint in the contextual data store 350 from the fingerprint matching module 330. The contextual response module 340 retrieves the matching contextual information from the contextual data store 350 to determine the proper context for the client device 120 and the correct response for the request from client device 120.

In one embodiment, for a client device 120 that supports an application ecosystem, the contextual response module 340 uses the matching contextual information to determine whether the application 121 that the contextual deep link includes link data for is installed on the client device 120. As noted above, the contextual information may include a list of applications installed on the client device 120. While this information is received by the contextual deep linking server 110 from an application 121, the information can be received from an application 121 that is different from the application for which the contextual response module 340 is checking the installation status.

If the application is installed, the contextual response module 340 includes in the response a message that causes the client device 120 to initiate (e.g., open or bring into focus) the application 121 associated with the contextual deep link. For example, the response may include a URL identifying the application 121 that causes the operating system on the client device 120 to initiate the application.

If the application 121 is not installed, the contextual response module 340 includes in the response a message redirecting the client device 120 to the application page of the application store 140 of the application ecosystem to allow the user to install the application. For example, the response may include a URL identifying the landing page for the application 121 in an application store interfacing application that causes the operating system on the client device 120 to initiate the application store interfacing application and the application store interfacing application to display the landing page.

In one embodiment, when no contextual information is available for the contextual response module 340 to determine whether the application 121 is installed, the contextual response module 340 defaults to sending the message that redirects the client device 120 to the application store 140.

In one embodiment, the contextual response module 340 uses the matching contextual information to determine the platform type of the client device 120. Once the contextual response module 340 determines the platform type of the client device 120, the contextual response module 340 responds to the request of the client device 120 with a response that can be executed by the specific platform type of the client device 120. Examples of contextual information that may be used by the contextual response module 340 to determine the platform type of the client device 120 includes the operating system type and version, user agent information, device model, and so on.

When the platform type is one that includes an application ecosystem, the contextual response module 340 may include in the response one of the responses described above depending on whether the application is installed or not installed.

When the platform type is one that does not support an application ecosystem, the contextual response module 340 may include in the response a message that causes the client device 120 to be redirected to an alternative element that is supported by the client device 120. This alternative element presents information to the user regarding the application and may also include an interface option to allow the user to send another or the same contextual deep link to a client device 120 of the user's that supports an application ecosystem.

For example, the client device 120 may be a desktop computer that has an operating system that does not support an application ecosystem, and the request associated with the contextual deep link may have been received by the contextual deep link server 110 from the web browser 123 of the client device 120 (e.g., by clicking on a hyperlink for the contextual deep link). The response provided by the contextual response module 340 may include a redirection for the web browser 123 to an alternative landing page that includes an option for the user to send a text message to the user's smartphone that supports the application ecosystem. The text message that is sent to the smartphone may include the same contextual deep link or a newly generated contextual deep link with the same associated link data. As another example, the contextual response module 340 may send a message to the client device 120 redirecting the web browser 123 of the client device 120 to a banner or landing page introducing the application 121 or displaying web-based version of the application.

After sending the contextual response to the client device 120 for a contextual deep link, the contextual response module 340 modifies the entry in the link data store 360 for the contextual deep link with the fingerprint for the client device 120 that made the request associated with the contextual deep link.

The link data module 370 responds to link data requests from the client device 120 with link data. This request may be made by the application 121 of the client device 120. After receiving a request from the client device 120 for link data, the link data module 370 may receive an indication of a matching fingerprint in the link data store 360 from the fingerprint matching module 330. The link data module 370 retrieves the matching link data from the link data store 360 for the matching fingerprint and returns this link data to the client device 120.

In many cases, the fingerprint matching module 330 may not find a matching fingerprint. The link data module 370 can receive a link data request from the application 121 of the client device 120 upon each initiation of the application 121. However, only in certain cases will link data be available. These cases include when the contextual deep linking server 110 has recently received a request associated with a contextual deep link from the client device 120 upon which the application is installed. In those cases, a fingerprint is associated with link data in the link data store 360.

In one embodiment, the link data module 370 also determines a timestamp at which the fingerprint was added to an entry of link data in the link data store 360. If that timestamp is beyond a certain range (e.g., 2 hours), the link data module 370 does not retrieve the associated link data for transmission to the client device 120. This "expires" the link data and may help to prevent a scenario where a first client device 120 with a fingerprint sends a request associated with a contextual deep link and a second client device 120 with the same fingerprint later requests an associated link data. Without a means to expire old requests, the link data module 370 may in these cases send the link data to the second client device 120 although the link data was not intended for the second client device 120. However, such a scenario would be unlikely and would only occur when the two client devices 120 involved have enough similar characteristics such that the fingerprints for the two client devices 120 are the same.

In one embodiment, once a link data is successfully retrieved, the link data module 370 removes the entry for that link data from the link data store 360. This means that each link data entry is used once to transfer link data.

Example Application Search Engine Using Contextual Deep Links

In some embodiments, the server link module 115 also includes a server deep link database that includes locations for each application 121 that it supports and which is similar to the deep link database 260 on the client device 120. In addition, each entry for a location in the server deep link database may be associated with various metadata for the location, such as a title. These locations may be received from the deep link database 260 of each client link module 122, may be directly received from the developer of the application, or may be received from the client link module 122 as the client link module 122 gathers the locations that a user browses through in an application.

The server deep link database allows the server link module 115 to receive search requests from client devices 120 for the various locations stored in the server deep link database for associated applications. The server link module 115 responds to these search requests by providing ranked search results, thus providing a search capability for locations inside applications. Each entry in the ranked search results includes a location to an application. The search results may be ranked on popularity or metadata collected for each location and stored in the server deep link database. The location results may also indicate whether the user's client device 120 has the associated application installed based on the contextual information stored for the user's client device 120 in the contextual data store 350.

If the user selects one of these location results, the server link module 115 creates an entry in the link data store 360 with the location from the result and the fingerprint of the client device 120. The server link module 115 responds to the user's client device 120 with a response similar to the response for a contextual deep link associated with the same link data, as described above for the contextual response module 340. For example, if the user's client device 120 has the associated application installed, the response would cause the user's client device 120 to initiate the application and retrieve the link data indicating the location from the search results.

Example Flows

Figure 4:
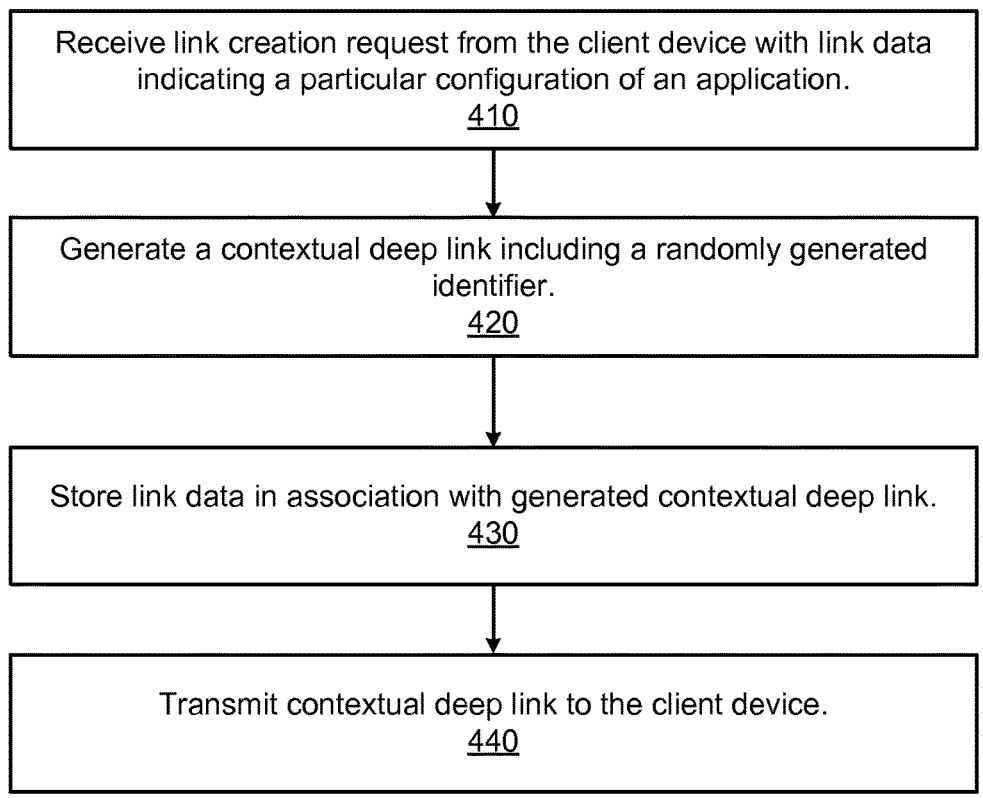
FIG. 4 is a flow chart illustrating an exemplary method for generating a contextual deep link according to one embodiment.

FIG. 4 is a flow chart illustrating an exemplary method 400 for generating a contextual deep link according to one embodiment. In one embodiment, FIG. 4 attributes the steps of the method 400 to the server link module 115 of the contextual deep linking server 110. However, some or all of the steps may be performed by other elements. In addition, some embodiments may perform the steps in parallel, perform the steps in different orders, or perform different steps. Also, it is noted that in one example embodiment the steps and/or modules may be embodied as instructions, e.g., instructions 724, that may be executed by the processor 702 described with respect to FIG. 7.

The contextual deep linking server 110 receives 410 a link creation request for a contextual deep link from the client device 120 with link data indicating a particular configuration of an application 121. As noted above, the configuration of the application 121 may include a location in the application 121 or other configuration information.

The contextual deep linking server 110 generates 420 a contextual deep link including a randomly generated identifier. As noted above, the contextual deep link may be a URL with the randomly generated identifier as a query string of the URL.

The contextual deep linking server 110 stores 430 the link data in association with generated contextual deep link. As noted above, the link data can be retrieved by referencing its associated contextual deep link. The contextual deep linking server 110 transmits 440 the contextual deep link to the client device 120.

Figure 5:
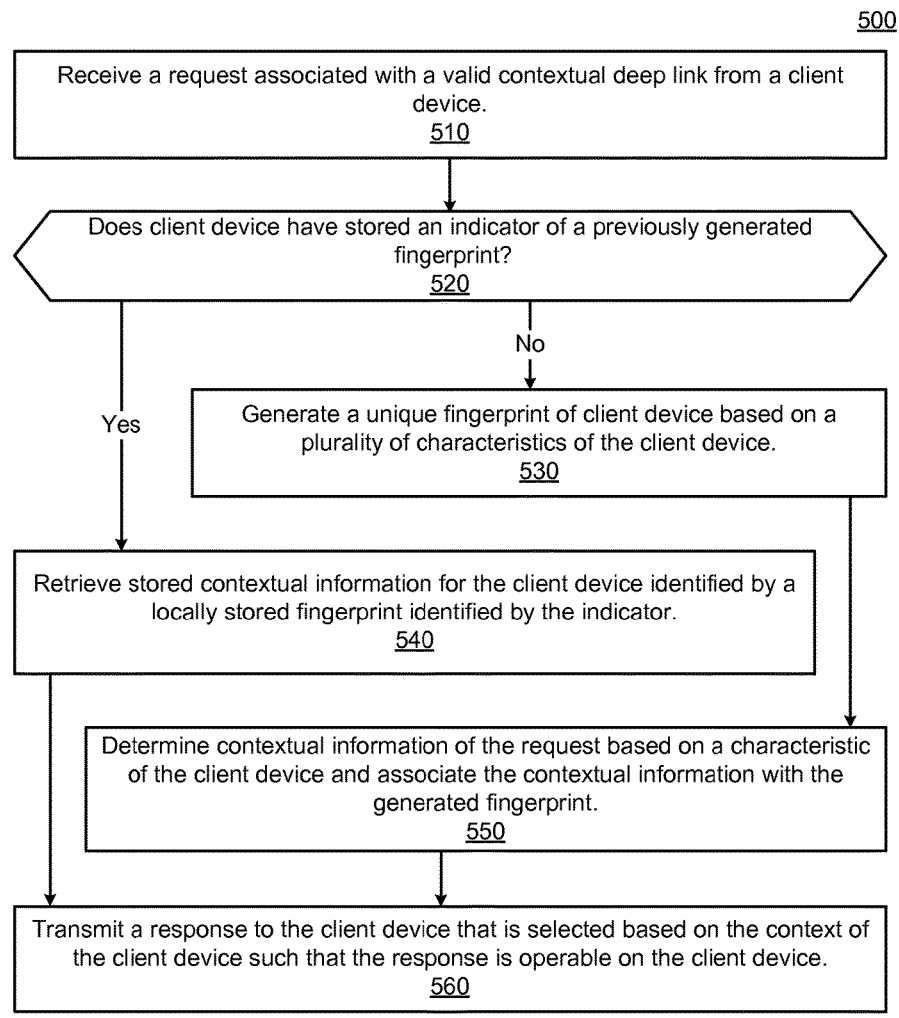
FIG. 5 is a flow chart illustrating an exemplary method for responding to a request associated with a contextual deep link with a context based response according to one embodiment.

FIG. 5 is a flow chart illustrating an exemplary method 500 for responding to a request associated with a contextual deep link with a context based response according to one embodiment. In one embodiment, FIG. 5 attributes the steps of the method 500 to the server link module 115 of the contextual deep linking server 110. However, some or all of the steps may be performed by other elements. In addition, some embodiments may perform the steps in parallel, perform the steps in different orders, or perform different steps. Also, it is noted that in one example embodiment the steps and/or modules may be embodied as instructions, e.g., instructions 724, that may be executed by the processor 702 described with respect to FIG. 7.

The contextual deep linking server 110 receives 510 a request associated with a valid contextual deep link from a client device 120. As noted above, the contextual deep link may be represented by a hyperlink, and the request may be a HTTP request.

The contextual deep linking server 110 determines at 520 if the client device 120 has stored an indicator of a previously generated fingerprint. This may be stored in a cookie on the client device 120. The previously generated fingerprint is a fingerprint that was previously generated by the contextual deep linking server 110 during a previous encounter with the client device 120. In other words, the contextual deep linking server 110 determines whether the particular client device 120 has been encountered before. As noted previously, a fingerprint is unique and is generated based on the characteristics of the client device 120.

If the client device 120 does not have an indicator of a previously stored fingerprint, the contextual deep linking server 110 generates 530 a unique fingerprint of client device based on a plurality of characteristics of the client device. As noted above, this fingerprint may be stored on the contextual deep linking server 110 and may be indicated by an indicator stored on the client device 120.

Subsequently, the contextual deep linking server 110 determines 550 contextual information of the request based on a characteristic of the client device 120 and associates the contextual information with the generated fingerprint. This contextual information may include information such as device model, operating system type, and other characteristics as described above. The contextual information and the fingerprint may be stored on the contextual deep linking server 110.

Alternatively, if the client device 120 does have a previously stored fingerprint, the contextual deep linking server 110 retrieves 540 stored contextual information for the client device 120 identified by a locally stored fingerprint matching the previously generated fingerprint. As described above, the contextual deep linking server 110 matches the fingerprint stored on the client device 120 with a locally stored fingerprint to find the associated contextual information stored on the contextual deep linking server 110.

The contextual deep linking server 110 transmits 560 a response to the client device that is selected based on the context of the client device such that the response is operable on the client device 120. As noted previously, this response may be different based on the contextual information. For example, if the client device 120 is determined to be a desktop computer not supporting an application ecosystem, the contextual deep linking server 110 may transmit a response that redirects the client device 120 to a landing page. If the client device 120 supports an application ecosystem, the contextual deep linking server 110 may transmit a response that causes the client device 120 to initiate the application associated with the link data of the contextual deep link. If the contextual information indicates that the application in not installed, the contextual deep linking server 110 may transmit a response to redirect the user to the application store.

Figure 6:
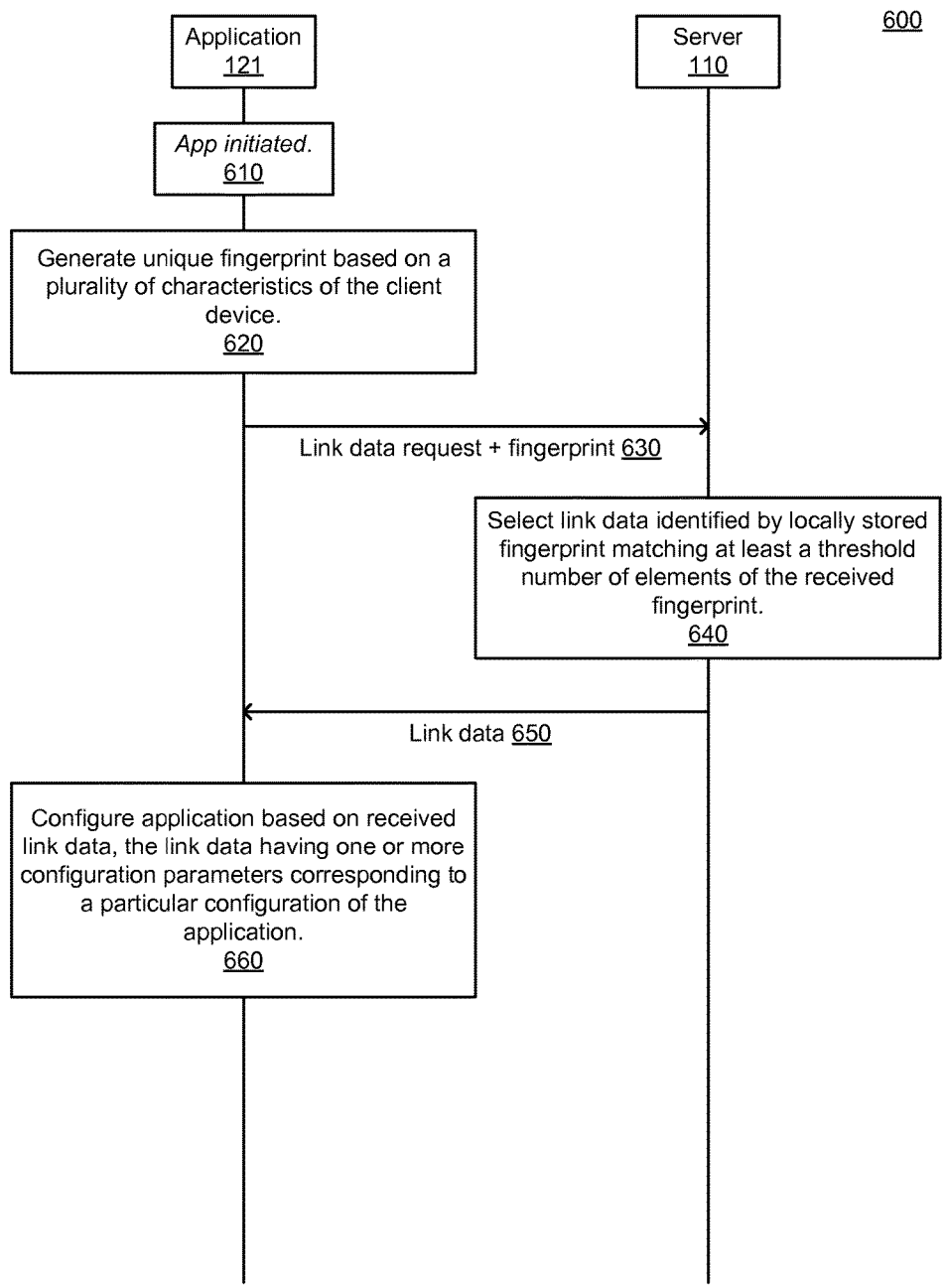
FIG. 6 is an interaction diagram illustrating an exemplary interaction for requesting and transmitting link data according to one embodiment.

FIG. 6 is an interaction diagram illustrating an exemplary interaction 600 for requesting and transmitting link data according to one embodiment. In one embodiment, FIG. 6 attributes the steps of the interaction 600 to the application 121 and the contextual deep linking server 110. However, some or all of the steps may be performed by other elements. In addition, some embodiments may perform the steps in parallel, perform the steps in different orders, or perform different steps. Also, it is noted that in one example embodiment the steps and/or modules may be embodied as instructions, e.g., instructions 724, that may be executed by the processor 702 described with respect to FIG. 7.

Initially, the application 121 is initiated 610 or started. This may occur when the client device 120 automatically starts the application 121 in response to a user interacting with a contextual deep link as described above. For example, the response from the contextual deep link may cause the client device 120 to direct the user to an application store to install the application 121. Once the application 121 is installed, it may be initiated automatically or by the user. The application 121 generates 620 a unique fingerprint based on a plurality of characteristics of the client device 120. The characteristics may include a hardware identifier, IP address, or other identifier or combination of identifiers of the client device 120 that can uniquely identify the client device 120. The application 121 sends a message 630 including a link data request and the fingerprint to the contextual deep linking server 110.

The contextual deep linking server 110 selects link data identified by a locally stored fingerprint matching at least a threshold number of elements of the received fingerprint. The locally stored fingerprint is stored at the contextual deep linking server 110. Once a locally stored fingerprint is found that matches the fingerprint received from the application 121, the contextual deep linking server 110 selects the link data associated with this fingerprint. This link data may be stored in the link data store 360.

The contextual deep linking server 110 sends a message 650 with the selected link data to the application 121.

The application 121 configures itself based on the received link data, the link data having one or more configuration parameters corresponding to a particular configuration of the application. This may occur in the same method as described above for the application configuration module 250.

Example Machine Architecture

Figure 7:
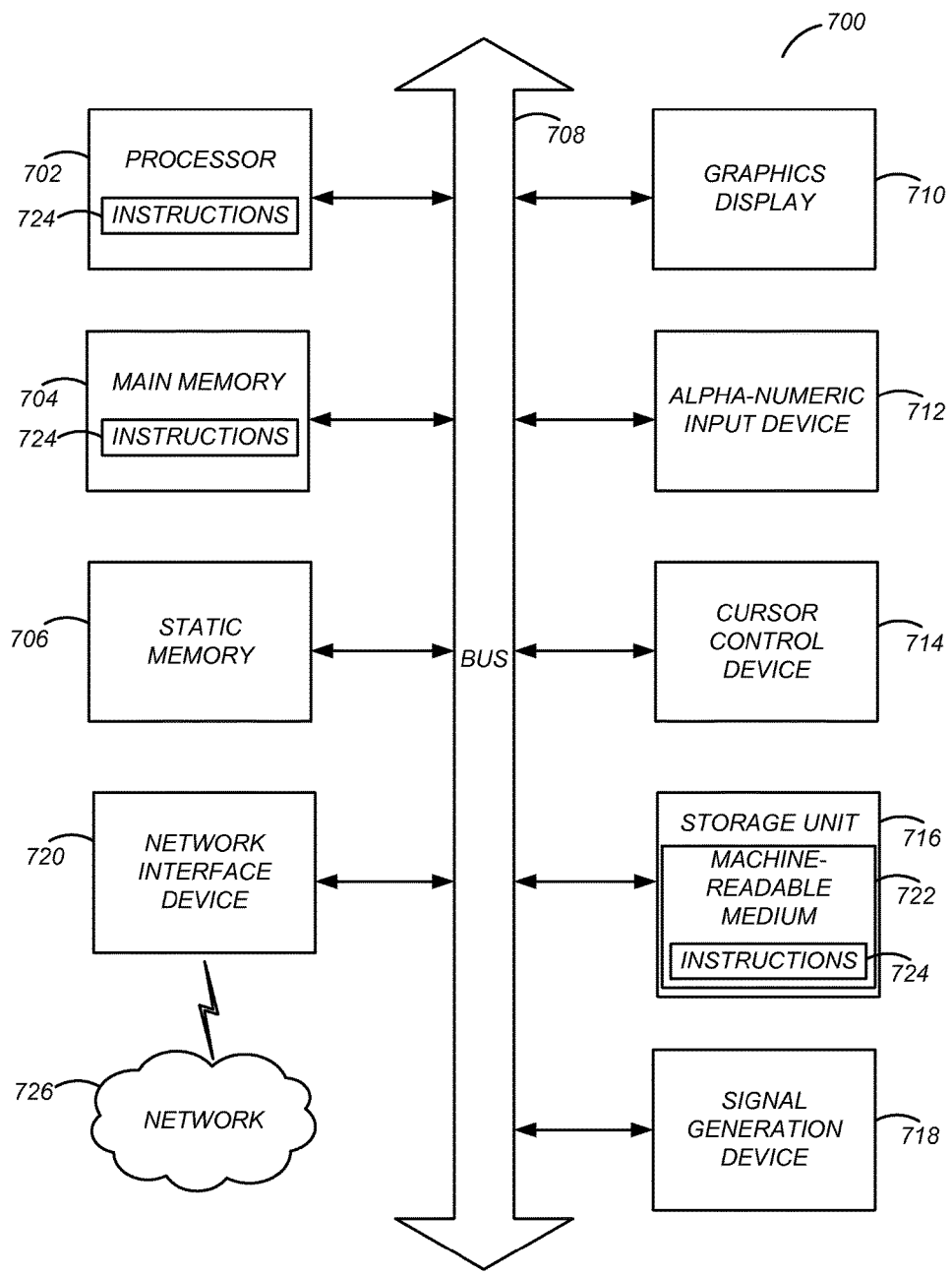
FIG. 7 is a block diagram illustrating components of an example machine able to read instructions from a machine-readable medium and execute them in a processor (or controller).

FIG. 7 is a block diagram illustrating components of an example machine able to read instructions from a machine-readable medium and execute them in a processor (or controller). Specifically, FIG. 7 shows a diagrammatic representation of a machine in the example form of a computer system 700. The computer system 700 can be used to execute instructions 724 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment. The computer system 700 is used to execute the processes and functionality described in FIGS. 1-6.

The machine may be a server computer, a client computer, a personal computer (PC), a tablet PC, a set-top box (STB), a smartphone, an internet of things (IoT) appliance, a network router, switch or bridge, or any machine capable of executing instructions 724 (sequential or otherwise) that specify actions to be taken by that machine. Further, while only a single machine is illustrated, the term "machine" shall also be taken to include any collection of machines that individually or jointly execute instructions 724 to perform any one or more of the methodologies discussed herein.

The example computer system 700 includes one or more processing units (generally processor 702). The processor 702 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 700 also includes a main memory 704. The computer system may include a storage unit 716. The processor 702, memory 704 and the storage unit 716 communicate via a bus 708.

In addition, the computer system 706 can include a static memory 706, a display driver 710 (e.g., to drive a plasma display panel (PDP), a liquid crystal display (LCD), or a projector). The computer system 700 may also include alphanumeric input device 712 (e.g., a keyboard), a cursor control device 714 (e.g., a mouse, a trackball, a joystick, a motion sensor, or other pointing instrument), a signal generation device 718 (e.g., a speaker), and a network interface device 720, which also are configured to communicate via the bus 708.

The storage unit 716 includes a machine-readable medium 722 on which is stored instructions 724 (e.g., software) embodying any one or more of the methodologies or functions described herein. The instructions 724 may also reside, completely or at least partially, within the main memory 704 or within the processor 702 (e.g., within a processor's cache memory) during execution thereof by the computer system 700, the main memory 704 and the processor 702 also constituting machine-readable media. The instructions 724 may be transmitted or received over a network 726 via the network interface device 720.

While machine-readable medium 722 is shown in an example embodiment to be a single medium, the term "machine-readable medium" should be taken to include a single medium or multiple media (e.g., a centralized or distributed database, or associated caches and servers) able to store the instructions 724. The term "machine-readable medium" shall also be taken to include any medium that is capable of storing instructions 724 for execution by the machine and that cause the machine to perform any one or more of the methodologies disclosed herein. The term "machine-readable medium" includes, but not be limited to, data repositories in the form of solid-state memories, optical media, and magnetic media.

Additional Considerations

The contextual deep linking system as disclosed provides benefits and advantages that include the ability for the contextual deep link to be able to function under any context of the client device. A deep link that was generated without an understanding of the context of the client device would instead provide a link that might not function properly depending on the context of the client device. This would create an error message on the client device. Instead, the current disclosure can create a contextual deep link that does not cause an error under any context.

To achieve this, in one embodiment, the contextual deep linking system identifies client devices with unique fingerprints as disclosed above and gathers contextual information for the client devices, associating this contextual information with the fingerprint. As the system is used across multiple applications, it can gather contextual information across platforms and be able to have more information about each client device than each application can gather individually.

Another advantage is that the system can pass link data from an application or other entity requesting a contextual deep link to any other application that is indicated in the link data and for which the link data provides a particular configuration. This is unlike other systems, which are not standardized across applications and platforms and so are limited in scope.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1, 2, and 3. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 702, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors 702 or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for generating and responding to contextual deep links through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising:
    receiving, at a server, from a client device, a request associated with an existing valid contextual deep link, the contextual deep link associated with link data indicating a particular configuration of an application, the request transmitted by the client device in response to a user interacting with the contextual deep link;
    retrieving, responsive to determining based on information in the request that the client device has stored an indicator of a previously generated fingerprint identifying the client device, stored contextual information for the client device associated with a locally stored fingerprint indicated by the indicator of the previously generated fingerprint;
    associating the link data for the valid contextual deep link with the locally stored fingerprint;
    transmitting, to the client device, a response that is selected based on the contextual information of the client device, the response including a redirect instruction that is customized for the client device using the contextual information identified for the client device;

receiving, from an application of the client device, a link data request and a fingerprint generated by the application, the link data request transmitted by the application of the client device in response to the redirect instruction;

selecting the link data identified by locally stored fingerprint matching at least a threshold number of elements of the received fingerprint; and transmitting, to the application of the client device, the link data.

2. The method of claim 1, further comprising:

generating, responsive to determining that the client device does not have an indicator of the previously generated fingerprint, a unique fingerprint of the client device based on a plurality of characteristics of the client device and determining contextual information of the request based on a characteristic of the client device.

3. The method of claim 1, wherein the contextual information of the client device indicates an environment that does not support an application ecosystem, and wherein the response indicates a network location that includes an interface to allow a user to forward the valid contextual deep link to a second client device of the user that supports an application ecosystem.

4. The method of claim 1, wherein the contextual information of the client device indicates an environment that supports an application ecosystem and indicates the application referenced in the valid contextual deep link is installed on the client device, and wherein the response includes data that causes the client device to initiate the application referenced in the valid contextual deep link.

5. The method of claim 1, wherein the contextual information of the client device indicates an environment that supports an application ecosystem and indicates the application referenced in the valid contextual deep link is not installed on the client device, and wherein the response includes data that causes the client device to initiate an application store application installed on the client device and pass an identifier of the application referenced in the valid contextual deep link to the application store application.

6. The method of claim 1, wherein the stored contextual information includes a list of apps installed on the client device detected based information previously received from a second application on the client device.

7. The method of claim 1, wherein the link data indicates a specific location in the application.

8. A system comprising:

a processor; and a non-transitory computer readable storage medium storing instructions thereon, that when executed by the processor, causes the processor to:

receive, from a client device, a request associated with an existing valid contextual deep link, the contextual deep link associated with link data indicating a particular configuration of an application, the request transmitted by the client device in response to a user interacting with the contextual deep link;

retrieve, responsive to determining based on information in the request that the client device has stored a previously generated fingerprint identifying the client device, stored contextual information for the client device identified by a locally stored fingerprint that matches the previously generated fingerprint;

associate the link data for the valid contextual deep link with the locally stored fingerprint;

transmit a response to the client device that is selected based on the contextual information of the client device, the response including a redirect instruction that is customized for the client device using the contextual information identified for the client device;

receive, from an application of the client device, a link data request and a fingerprint generated by the application, the link data request transmitted by the application of the client device in response to the redirect instruction;

select the link data identified by locally stored fingerprint matching at least a threshold number of elements of the received fingerprint; and transmit, to the application of the client device, the link data.

9. The system of claim 8, wherein the non-transitory computer readable storage medium stores further instructions thereon, that when executed by the processor, causes the processor to:

generate, responsive to a determination that the client device does not have an indicator of the previously generated fingerprint, a unique fingerprint of the client device based on a plurality of characteristics of the client device and determining contextual information of the request based on a characteristic of the client device.

10. The system of claim 8, wherein the contextual information of the client device indicates an environment that supports an application ecosystem and indicates the application referenced in the valid contextual deep link is installed on the client device, and wherein the response includes data that causes the client device to initiate the application referenced in the valid contextual deep link.

11. The system of claim 8, wherein the contextual information of the client device indicates an environment that supports an application ecosystem and indicates the application referenced in the valid contextual deep link is not installed on the client device, and wherein the response includes data that causes the client device to initiate an application store application installed on the client device and pass an identifier of the application referenced in the valid contextual deep link to the application store application.

12. The system of claim 8, wherein the non-transitory computer readable storage medium stores further instructions thereon, that when executed by the processor, causes the processor to:

receive, from the client device, a search request with an identifier to search a database, the database including a plurality of location entries for a plurality of applications;

search the database for a plurality of candidate location entries based on the identifier;

rank the plurality of candidate location entries based on the contextual information of the client device and an associated metadata of each candidate link data entry;

provide, to the client device, a list indicating the ranked plurality of candidate location entries;

receive a selection of one of the plurality of candidate location entries in the list; and send, to the client device, a second contextual deep link associated with link data including the selected candidate location entry.

13. A non-transitory computer readable storage medium configured to store instructions, the instructions when executed by a processor cause the processor to:

receive, from a client device, a request associated with an existing valid contextual deep link, the contextual deep link associated with link data indicating a particular configuration of an application, the request transmitted by the client device in response to a user interacting with the contextual deep link;

retrieve, responsive to determining based on information in the request that the client device has stored a previously generated fingerprint identifying the client device, stored contextual information for the client device identified by a locally stored fingerprint that matches the previously generated fingerprint;

associate the link data for the valid contextual deep link with the locally stored fingerprint;

transmit a response to the client device that is selected based on the contextual information of the client device, the response including a redirect instruction that is customized for the client device using the contextual information identified for the client device;

receive, from an application of the client device, a link data request and a fingerprint generated by the application, the link data request transmitted by the application of the client device in response to the redirect instruction;

select the link data identified by locally stored fingerprint matching at least a threshold number of elements of the received fingerprint; and transmit, to the application of the client device, the link data.

14. The non-transitory computer readable storage medium of claim 13, wherein the non-transitory computer readable storage medium stores further instructions thereon, that when executed by the processor, causes the processor to:

generate, responsive to a determination that the client device does not have an indicator of the previously generated fingerprint, a unique fingerprint of the client device based on a plurality of characteristics of the client device and determining contextual information of the request based on a characteristic of the client device.

15. The non-transitory computer readable storage medium of claim 13, wherein the contextual information of the client device indicates an environment that supports an application ecosystem and indicates the application referenced in the valid contextual deep link is installed on the client device, and wherein the response includes data that causes the client device to initiate the application referenced in the valid contextual deep link.

16. The non-transitory computer readable storage medium of claim 13, wherein the contextual information of the client device indicates an environment that supports an application ecosystem and indicates the application referenced in the valid contextual deep link is not installed on the client device, and wherein the response includes data that causes the client device to initiate an application store application installed on the client device and pass an identifier of the application referenced in the valid contextual deep link to the application store application.

17. The non-transitory computer readable storage medium of claim 13, wherein the stored contextual information includes a list of apps installed on the client device detected based information previously received from a second application on the client device.

18. The non-transitory computer readable storage medium of claim 13, wherein the contextual deep link is associated with a prior link generation request from the application of a second client device submitted with the link data.

19. The non-transitory computer readable storage medium of claim 13, wherein the non-transitory computer readable storage medium stores further instructions thereon, that when executed by the processor, causes the processor to:

receive, from the client device, a search request with an identifier to search a database, the database including a plurality of location entries for a plurality of applications;

search the database for a plurality of candidate location entries based on the identifier;

rank the plurality of candidate location entries based on the contextual information of the client device and an associated metadata of each candidate link data entry;

provide, to the client device, a list indicating the ranked plurality of candidate location entries;

receive a selection of one of the plurality of candidate location entries in the list; and send, to the client device, a second contextual deep link associated with link data including the selected candidate location entry.

* * * * *

UNITED STATES PATENT AND TRADEMARK OFFICE
CERTIFICATE OF CORRECTION

PATENT NO. : 10,057,741 B2
APPLICATION NO. : 14/935301
DATED : August 21, 2018
INVENTOR(S) : Michael Charles Molinet et al.

Page 1 of 1

It is certified that error appears in the above-identified patent and that said Letters Patent is hereby corrected as shown below:

In the Claims

Column 23, Line 45, Claim 6: "detected based information" to read as --detected based on information--

Column 26, Line 17, 18, Claim 17: "detected based information" to read as --detected based on information--

Signed and Sealed this
Twenty-fifth Day of June, 2019

Andrei Iancu
*Director of the United States Patent and Trademark Office*